(12) United States Patent  
Moribe et al.

(10) Patent No.: US 9,387,770 B2  
(45) Date of Patent: Jul. 12, 2016

(54) CHARGING APPARATUS

(71) Applicants:DENSO WAVE INCORPORATED, Chita-gun, Aichi-pref. (JP); DENSO CORPORATION, Kariya, Aichi-pref. (JP)

(72) Inventors: Nobuo Moribe, Obu (JP); Yuji Tsuchiya, Nagoya (JP); Hironobu Ando, Obu (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 680 days.

(21) Appl. No.: 13/848,144

(22) Filed: Mar. 21, 2013

(65) Prior Publication Data

US 2014/0055083 A1 Feb. 27, 2014

(30) Foreign Application Priority Data

Aug. 27, 2012 (JP) ................................ 2012-186059

(51) Int. Cl.
*B60L 11/18* (2006.01)
*H02J 7/00* (2006.01)

(52) U.S. Cl.
CPC ......... *B60L 11/1825* (2013.01); *B60L 11/1816* (2013.01); *H02J 7/0042* (2013.01); *B60L 2230/12* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
CPC ............ B60L 11/1816; B60L 11/1825; B60L 2230/12
USPC .......................................... 191/12 R; 320/107
See application file for complete search history.

(56) References Cited

U.S. PATENT DOCUMENTS

| | | | | |
|---|---|---|---|---|
| 3,802,351 A | * | 4/1974 | Pascuzzi | B66C 13/12 104/112 |
| 4,093,047 A | * | 6/1978 | Wampfler | H02G 11/003 174/69 |
| 4,846,320 A | * | 7/1989 | Clarke | H02G 11/003 191/12 R |
| 6,484,959 B1 | * | 11/2002 | Grammenz | A61G 15/18 137/355.2 |
| D698,309 S | * | 1/2014 | Moribe | D13/107 |
| D718,706 S | * | 12/2014 | Moribe | D13/107 |

(Continued)

FOREIGN PATENT DOCUMENTS

| | | |
|---|---|---|
| JP | S63-191836 U | 12/1988 |
| JP | 2011-160615 A | 8/2011 |
| JP | 2013-051827 A | 3/2013 |

OTHER PUBLICATIONS

Office Action issued Nov. 10, 2015 in the corresponding JP application No. 2012-186059 (with English translation).

*Primary Examiner* — Zachary Kuhfuss
(74) *Attorney, Agent, or Firm* — Posz Law Group, PLC

(57) ABSTRACT

A charging apparatus is used for charging a storage battery. This charging apparatus includes a body connected to a power source, a connector connected to the storage battery, an electric cable connecting between the body and the connector, a support member provided in the body, and a holding member provided in the body. The electric cable includes a held member at a predetermined position in an intermediate portion of the electric cable. The support member supports the connector. The holding member detachably holds the held member.

16 Claims, 15 Drawing Sheets

(56) References Cited

U.S. PATENT DOCUMENTS

| | | | | |
|---|---|---|---|---|
| D718,707 S | * | 12/2014 | Moribe | D13/107 |
| D718,708 S | * | 12/2014 | Moribe | D13/107 |
| D718,709 S | * | 12/2014 | Moribe | D13/107 |
| D719,089 S | * | 12/2014 | Moribe | D13/107 |
| D722,017 S | * | 2/2015 | Moribe | D13/107 |
| D722,291 S | * | 2/2015 | Moribe | D13/107 |
| D731,965 S | * | 6/2015 | Moribe | D13/107 |
| D732,470 S | * | 6/2015 | Moribe | D13/107 |
| D733,044 S | * | 6/2015 | Moribe | D13/107 |
| 2005/0091867 A1 | * | 5/2005 | Andis | A45D 20/12 34/96 |
| 2005/0189453 A1 | * | 9/2005 | DeGuevara | H02G 3/305 248/68.1 |
| 2011/0169447 A1 | * | 7/2011 | Brown | B60L 3/0069 320/109 |
| 2012/0161703 A1 | * | 6/2012 | Gonzalez | B60L 11/1825 320/109 |
| 2013/0020990 A1 | * | 1/2013 | DeBoer | B60L 11/1824 320/109 |
| 2013/0175083 A1 | * | 7/2013 | Bonwit | B60L 11/1818 174/520 |
| 2013/0187599 A1 | * | 7/2013 | Ranga | B60L 11/1825 320/109 |
| 2014/0111158 A1 | * | 4/2014 | Kinomura | H02G 3/0493 320/109 |
| 2014/0117144 A1 | * | 5/2014 | Kinomura | B65H 75/425 242/590 |
| 2014/0209354 A1 | * | 7/2014 | Hamada | B60L 11/1818 174/135 |
| 2014/0327556 A1 | * | 11/2014 | Reddy | B60L 11/1818 340/901 |

* cited by examiner

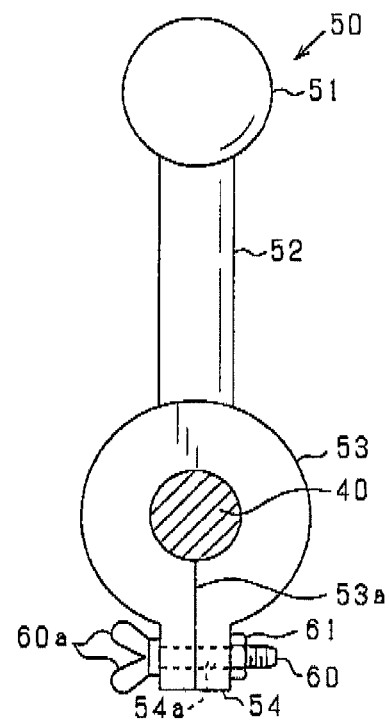
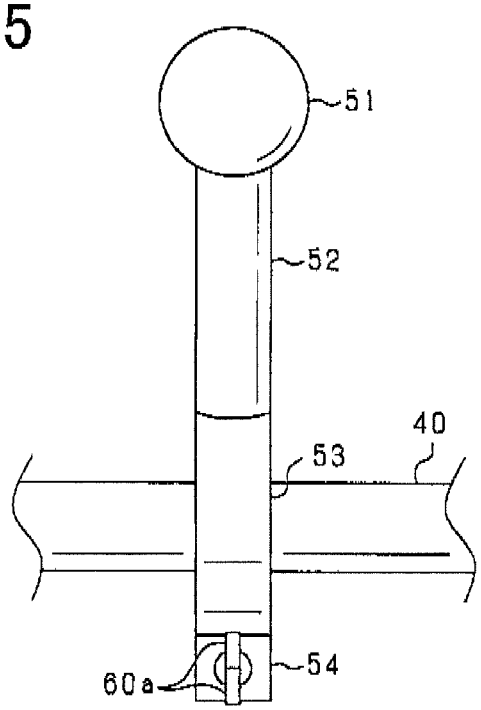

CHARGING APPARATUS

CROSS-REFERENCE TO RELATED APPLICATION

This application is based on and claims the benefit of priority from earlier Japanese Patent Application No. 2012-186059 filed Aug. 27, 2012, the description of which is incorporated herein by reference.

BACKGROUND

1. Technical Field

The present invention relates to a charging apparatus that charges a storage battery.

2. Related Art

In related art, there is known a charging apparatus used for charging a storage battery mounted in vehicles (see, for example, JP-A-UM-63-191836 and JP-A-2011-160615).

For example, JP-A-UM-63-191836 discloses a charging apparatus that includes an outer case, a drum-shaped inner case rotatably supported by the outer case, and an electric (input-output) cable capable of being wound around the outer periphery surface of the inner case. In the charging apparatus, the drum-shaped inner case is manually rotated to wind the electric cable around the peripheral surface of the inner case, and then the electric cable is held in the outer case.

JP-A-2011-160615 discloses a charging apparatus that includes an electric cable and a cable reel for winding up the electric cable by driving a motor. In the charging apparatus, the cable reel is mounted in a linear-shaped base which is located between a pair of rails provided in a wall surface of a garage and is movable with the cable reel along the rails by driving a motor. This cable reel is movable with the base along the rails, and is also movable relative to the base by driving a motor.

In both of JP-A-UM-63-191836 and JP-A-2011-160615 mentioned above, the electric cable of the charging apparatus is wound about the drum-shaped case or the cable reel. Therefore, the electric cable is likely to be unevenly wound up or tensional. Further, the electric cable may be curled while being repeatedly wound about the drum-shaped case or the cable reel. It may be problematically laborious to expand such a curled electric cable when charging a battery.

In addition, in the charging apparatus disclosed in JP-A-UM-63-191836, the drum-shaped case is required to be kept manually rotated until the electric cable is completely wound up. Therefore, the amount of work involved in storing the electric cable is large. On the other hand, in the charging apparatus disclosed in JP-A-2011-160615, the electric cable is wound up by a motor. Therefore, although the amount of work is small, the size of the charging station becomes unavoidably large.

SUMMARY

It is thus desired to provide a charging apparatus that has a simple configuration and enables storage of an electric cable in a desired shape with a small amount of work.

A charging apparatus for charging a storage battery according to an exemplary aspect of the present disclosure includes: a body connected to a power source; a connector connected to the storage battery; an electric cable connecting between the body and the connector, the electric cable including at least one held member at a predetermined position in an intermediate portion of the electric cable: a support member provided in the body, the support member supporting the connector; and a holding member provided in the body, the holding member detachably holding the held member.

With this configuration, the connector connected to the storage battery can be supported by the support member provided in the body. The electric cable connecting between the body and the connector is provided with a held member at a predetermined position in an intermediate portion of the electric cable. The body is provided with a holding member detachably holding the held member. Thus, the configuration for storing the electric cable can be simplified. At the same time, the electric cable can be stored with a small amount of work by only allowing the holding member of the body to hold the held member of the electric cable.

Further, in the electric cable, the position at which the electric cable is held is limited to the position of the held member. Therefore, the electric cable can be stored in a desired shape. Further, in the case where, for example, the electric cable is wound about a wind-up member of the body, the electric cable will be curled while being repeatedly wound about the wind-up member. However, in the charging apparatus having the configuration as set forth above, the electric cable will not be curled. Thus, the electric cable can be easily extended when charging a storage battery.

The held member may be a plurality of held members at predetermined intervals, and the holding member may be a plurality of holding members each detachably holding each of the held members and be provided in the body so as to be juxtaposed with each other.

With this configuration, the plurality of held members are provided to the electric cable at predetermined intervals. Thus, every time the electric cable is stored, the electric cable can be held at positions set at predetermined intervals. Further, the holding members are configured to be mated to the respective held members and provided in the body being juxtaposed with each other. Thus, the electric cable is stored being held and folded at predetermined intervals, with the folds being hung juxtaposed with each other. As a result, the electric cable, when it has a large length, can be efficiently stored in a desired shape.

The held member may be configured to be disengaged from the holding member by pulling the electric cable in a predetermined direction in a state where the held member is held by the holding member.

With this configuration, in a state where the held member is held by the holding member, the held member can be disengaged from the holding member by pulling the electric cable in a predetermined direction. Thus, the electric cable can be easily extended simply by being pulled in a predetermined direction in charging a storage battery.

In the holding member, a groove may be formed so as to vertically communicate with outside and to laterally extend. The held member may include: an engaging part engaged with the groove; and a head part being larger than the width of the groove With this configuration, the groove vertically communicates with the outside and laterally extends. The engaging part of the held member can be engaged with the groove. Further, since the head part of the held member is larger than the width of the groove, the head part of the held member can be supported by the groove. Thus, the held member can be held by the holding member in a simple configuration.

Further, with this configuration, in a state where the held member is held by the holding member, the engaging part of the held member can be detached from the groove of the holding member by pulling the electric cable toward an opening of the groove. Thus, the electric cable can be easily extended if only it is pulled toward the opening of the groove in charging a storage battery.

The groove may include an upper edge in which a recess engaged with the head part is formed. The upper edge may be inclined downward from the recess.

With this configuration, the groove is provided the upper end in which the recess is formed. Thus, the engaging part can be prevented from being unintentionally disengaged from the groove when the electric cable is intended to be stored. Since the upper edge is inclined downward from the recess, the head part is disengaged from the recess and easily slides down along the inclination of the upper edge when the electric cable is pulled toward the opening of the groove. Thus, the engaging part can be prevented from being unintentionally disengaged from the groove when the electric cable is intended to be stored, while it can be easily disengaged from the groove when a storage battery is charged.

In the configuration described above, in a case where a lower edge of the groove does not laterally extend longer than the upper edge but, for example, extends as long as the upper edge, the engaging part is likely to be disengaged from the groove despite the user's intention. In other words, when the electric cable is swung, the engaging part may hit against a lateral end portion at the lower edge of the groove. As a result, the head part and the engaging part are pivoted, centering on the hit position as a fulcrum, easily allowing the engaging part to come off from the groove.

To deal with this, the groove may include a lower edge which laterally extends longer than the upper edge. With this configuration, when the electric cable is swung, the engaging part will hardly hit against lateral end portion at the lower edge of the groove. Thus, the engaging part is disengaged from the groove when the electric cable is intended to be stored.

The body may include: an overhung portion laterally projected from the body, the holding member being formed in the overhung portion; and a storage portion storing the electric cable, the storage portion being provided below the overhung portion.

With this configuration, the body includes the overhung portion laterally projected, and the holding member is formed in the overhung portion. Thus, when the held member is held by the holding member, the electric cable is hung beneath the overhung portion. Accordingly, when the charging apparatus is set up outside a residential house, the overhung portion can mostly prevent rain drops from falling on the electric cable.

The storage portion storing the electric cable is provided under the overhung portion. Thus, at the same time with hanging the electric cable beneath the overhung portion, the electric cable can be immediately stored in the storage portion.

The storage portion may be surrounded from three of four lateral directions facing four lateral sides which are front, rear, left and right side of the body.

With this configuration, the storage portion is surrounded from three of four lateral directions. Thus, the electric cable stored in the storage portion can be hardly seen from the surroundings.

The held member may be a plurality of held members which are provided in the electric cable at predetermined intervals. The storage portion may have a vertical length in a height direction perpendicular to the lateral direction, the vertical length being larger than half of each of the predetermined intervals.

With this configuration, the plurality of held members are attached to the electric cable at predetermined intervals. Thus, every time the electric cable is stored, the electric cable can be held at positions set at predetermined intervals. Accordingly, the electric cable can be neatly stored in a predetermined shape.

The storage portion is provided under the overhung portion which is provided with the holding members. The length of the storage portion in the height direction is made larger than half of each predetermined interval set in the electric cable mentioned above. Thus, portions of the electric cable, each of which is held at its ends by the held members, are hardly brought into contact with the ground or the floor. Accordingly, the electric cable will be not stretched, or strongly loosened, and thus can be stored being more neatly shaped.

BRIEF DESCRIPTION OF DRAWINGS

In the accompanying drawings:

FIG. 4 is a front view showing the stopper in FIGS. 2, 3 and a screw fixing the stopper to the electric cable in FIG. 1;

FIG. 5 is a side view showing the stopper and the screw in FIG. 4;

DESCRIPTION OF EMBODIMENTS

With reference to the accompanying drawings, hereinafter are described a charging apparatus according to exemplary embodiments of the present invention.

(First Exemplary Embodiment)

Referring to FIGS. 1 to 15, a charging apparatus according to a first exemplary embodiment is described. The first exemplary embodiment is implemented as a charging apparatus which is set up outside a residential house to charge a lithium ion storage battery (storage battery) of an electric car (vehicle). The vehicle may be a hybrid car and the storage battery may be a lead storage battery.

Figure 1:
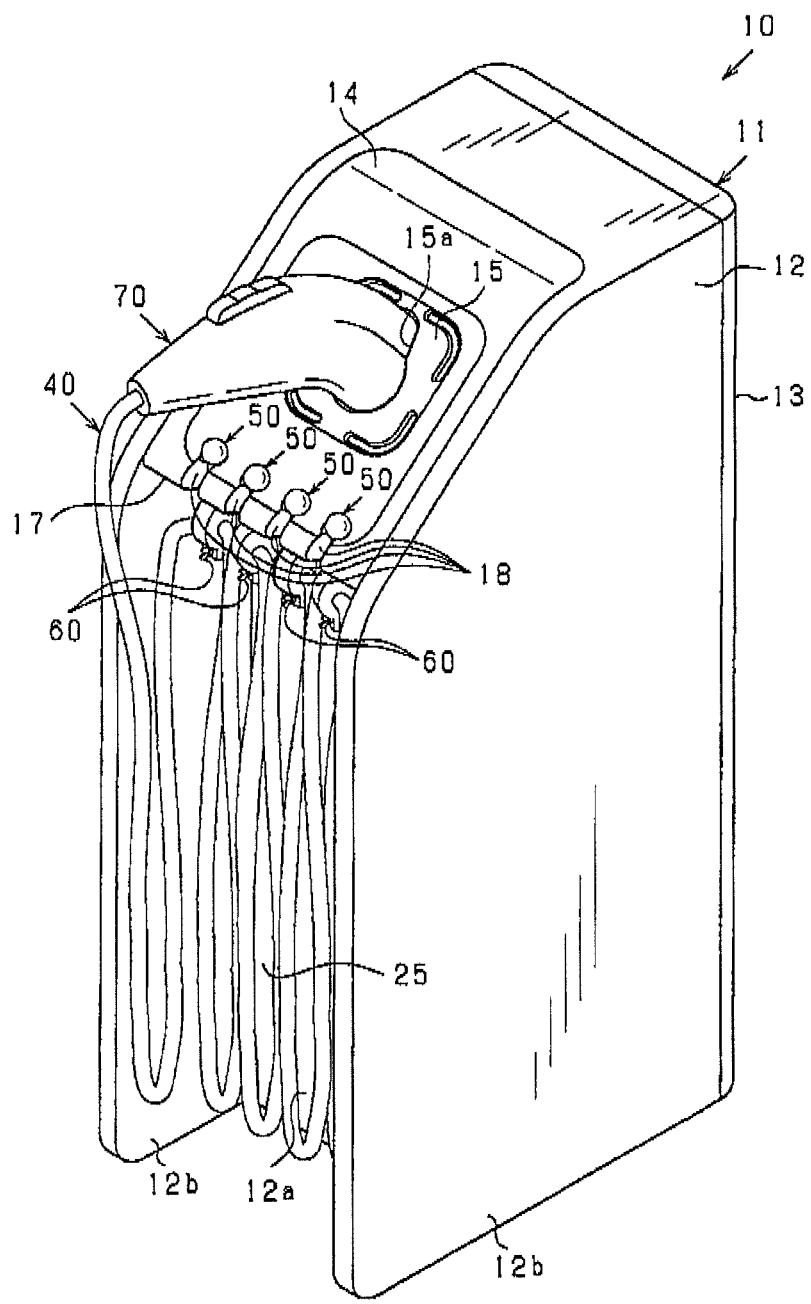
FIG. 1 is a perspective view showing a charging apparatus according to a first exemplary embodiment.

First, an outline of the charging apparatus is described. FIG. 1 shows a charging apparatus 10 according to the first exemplary embodiment. As shown in FIG. 1, the charging apparatus 10 includes a body 11, an electric cable 40 and a connector 70. The body 11 is connected to an AC power source (power source) of a residential house. The body 11 includes a power circuit, a controller and a detection circuit. The power circuit controls and outputs electric power supplied from the AC power source. The controller controls the state where the storage battery is charged. The detection circuit detects an amount of charge of the storage battery. The electric cable 40 has an end connected to the power circuit of the body 11. The electric cable 40 has the other end to which the connector 70 is connected. The connector 70 is connected to the connector of an electric car. In other words, the electric cable 40 establishes a connection between the power circuit of the body 11 and the connector 70.

In charging the storage battery of an electric car, the connector 70 of the charging apparatus 10 is connected to the connector which is connected to the storage battery of the electric car. The controller of the body 11 allows the power circuit to control electric power to be supplied to the storage battery, on the basis of an amount of charge, for example, of the storage battery, which is detected by the detection circuit. Electric power is supplied to the storage battery via the power circuit, the electric cable 40 and the connector 70 to thereby charge the storage battery. When the amount of charge of the storage battery detected by the detection circuit has reached a target amount of charge, the controller stops charging the storage battery.

The electric cable 40 is specifically described. The electric cable 40 is configured by coating an insulating material on a copper wire that passes current. The electric cable 40 has a length of about 6 m and a diameter of about 12 mm. When a storage battery is charged at a high speed, the electric cable 40 having a larger diameter is used.

The electric cable 40 is attached with a plurality of stoppers 50 (four in the present embodiment) at predetermined positions in an intermediate portion of the electric cable 40. The stoppers 50 are attached to the electric cable 40 at intervals (regular intervals) of about 1.2 m. An end of the electric cable 40, which is opposite to the end connected to the connector 70, is connected to a lower part of the body 11. A first stopper 50 is attached to the electric cable 40 so as to be positioned about 0.7 m from a portion in which the electric cable 40 is connected to the body 11. Second to fourth stoppers 50 are attached to the electric cable 40 at intervals of about 1.2 m from the first stopper 50. The interval between the fourth stopper 50 and the connector 70 is about 1.7 m which is larger than the intervals of about 1.2 m between the stoppers 50.

Figure 2:
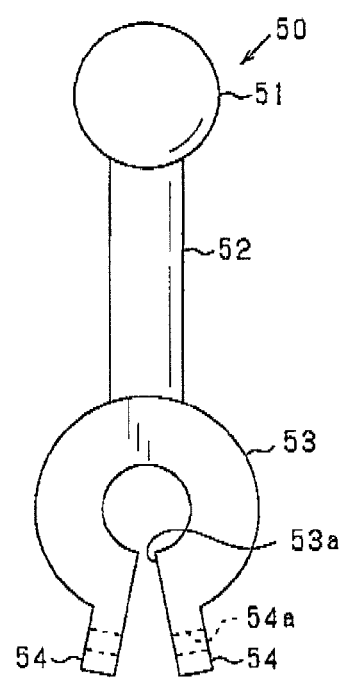
FIG. 2 is a front view showing a stopper (held member) provided in an electric cable of the charging apparatus in FIG. 1.
Figure 3:
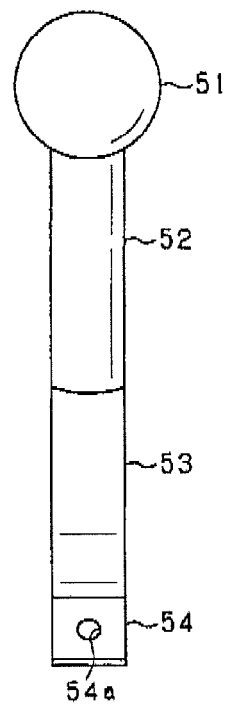
FIG. 3 is a side view showing the stopper in FIG. 2.

FIG. 2 is a front view showing one of the stoppers 50. FIG. 3 is a side view showing one of the stoppers 50. As shown in the figures, each stopper 50 (held member) includes a spherical part 51, a columnar part 52, an annular part 53 and projected parts 54. The stopper 50 is made such as of a resin or metal having elasticity.

The spherical part 51 (head part) is formed into a predetermined spherical shape. The columnar part 52 (engaging part) is formed into a columnar shape having a diameter smaller than that of the spherical part 51. The annular part 53 is formed into an annular shape having a diameter larger than that of the columnar part 52, with a sole cut 53a being formed at its circumferential position. The annular part 53 has an inner diameter which is set to be slightly smaller than the outer diameter of the electric cable 40.

The columnar part 52 has an end connected to the outer peripheral surface of the spherical part 51. The columnar part 52 has the other end connected to the outer peripheral surface of the annular part 53 on a side opposite to the cut 53a. In the outer peripheral surface of the annular part 53, the projected parts 54 are formed at the cut 53a so as to be projected in the radial direction of the annular part 53. Each of the projected parts 54 has a rectangular plate-like shape and is provided with a through hole 54a at approximately a center thereof. When the annular part 53 is left as it is, the cut 53a is open, with the projected parts 54 in a pair being spaced apart from each other.

Referring to FIGS. 4 and 5, hereinafter is described how each of the stoppers 50 is attached to the electric cable 40 by a user. FIG. 4 is a front view showing the stopper 50 and a screw 60 (wing screw in the present embodiment). FIG. 5 is a side view showing the stopper 50 and the screw 60.

In attaching each stopper 50 to the electric cable 40, the cut 53a of the annular part 53 is opened up to thrust the electric cable 40 radially inward through the cut 53a into the annular part 53. Then, the screw 60 having a head 60a is inserted into the through holes 54a of the pair of projected parts 54, followed by attaching a nut 61 to the screw 60. After that, the head 60a of the screw 60 is held and rotated by the user to tighten up the screw 60. When the screw 60 is tightened up, the projected parts 54 in a pair come close to each other and thus the cut 53a is almost closed. Thus, the inner diameter of the annular part 53 becomes smaller than in a state where the annular part 53 is left as it is. Accordingly, the outer peripheral surface of the electric cable 40 is brought into intimate contact with the inner peripheral surface of the annular part 53. In this way, the electric cable 40 and the stopper 50 are disabled from relative movement. As a result, the stopper 50 is brought into a state of being attached to the electric cable 40.

Figure 6:
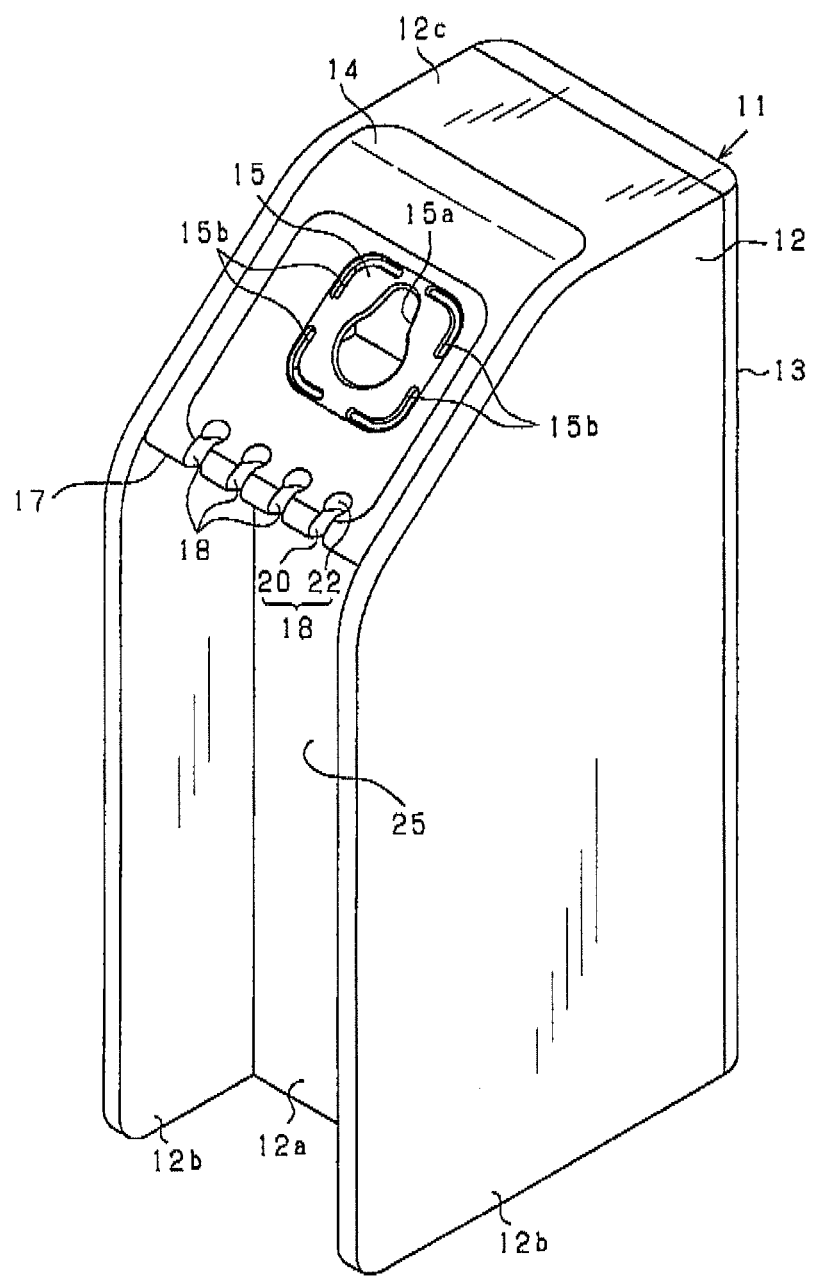
FIG. 6 is a perspective view showing a body of the charging apparatus in FIG. 1.
Figure 7:
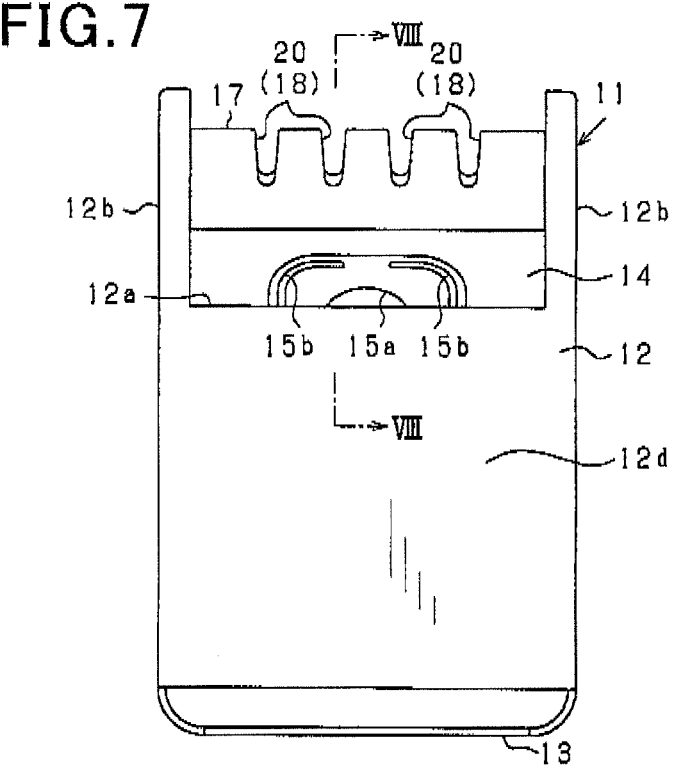
FIG. 7 is a bottom view showing the body shown in FIG. 6.

Referring to FIGS. 6 and 7, the body 11 is specifically described. FIG. 6 is a perspective view showing the body 11. FIG. 7 is a bottom view showing the body 11. As shown in the figures, the body 11 includes a housing 12, a cover 13 and a panel 14.

The housing 12 which is made of metal, such as an aluminum alloy or stainless steel, has a hollow rectangular parallelepiped shape. The housing 12 has a front plate 12a, two side plates 12b, a top plate 12c and a bottom plate 12d. The rear side of the housing 12 is open but is covered with the cover 13. The cover 13 which is made of metal, such as an aluminum alloy or stainless steel, has a rectangular plate-like shape. Each of the side plates 12b have a width larger than the distance between the cover 13 and the front plate 12a and thus are jutted out forward with reference to the front plate 12a.

Each of the side plates 12b has an obliquely cut upper front portion continuing to an upper rear end thereof which is connected to the top plate 12c. The panel 14 has an upper surface 14a and a lower surface 14b and is arranged being extended forward from a front end of the top plate 12c and along the obliquely cut upper front portions of the side plates 12b. Thus, the panel 14 is arranged so as to be more inclined downward as it extends forward. The panel 14 is formed of a resin plate.

The panel 14 is provided with a support member 15 that supports the connector 70. The support member 15 is provided with an opening 15a and through holes 15b. The opening 15a is used for inserting the connector 70 therethrough. The through holes 15b are used for transmitting the light of LEDs (light emitting diodes), not shown, that inform the state of charge or the occurrence of failures.

Figure 8:
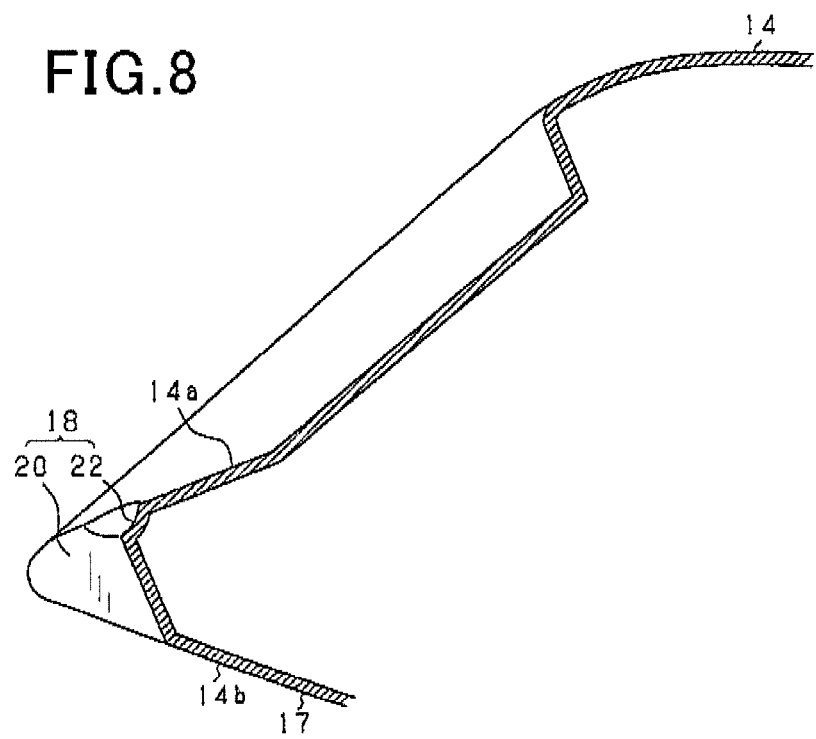
FIG. 8 is a cross-sectional view taken along the line VIII-VIII of FIG. 7.

FIG. 8 is a cross-sectional view taken along the line 8-8 of FIG. 7. The panel 14 has an overhung portion 17 which is jutted out forward (jutted out in a direction from the rear side to the front side of the housing 12) with reference to the front plate 12a. The overhung portion 17 is provided with a plurality of hanging portions 18 (four in the present embodiment; which are also called "holding members" or "cable receiving portions") that detachably hold the stoppers 50. The hanging portions 18 are configured to be mated to the respective stoppers 50 and thus the number of the hanging portions 18 is equal to that of the stoppers 50. The hanging portions 18 are formed being juxtaposed in a row on a front side of the housing 12.

Each hanging portion 18 includes a groove 20 and a recess 22. The groove 20 vertically communicates with the outside and extends rearward (extends in a lateral direction from the front side to the rear side of the housing 12). The recess 22 is used for fitting (engaging) the spherical part 51 of the stopper 50 thereto (therewith). The recess 22 is formed at a rear end of the groove 20 so as to include a rear end of an upper edge of the groove 20. The recess 22 has a hemispherical shape and has a curvature radius equal to that of the spherical part 51 of the stopper 50. The groove 20 has a width larger than the diameter of the columnar part 52 of the stopper 50. Accordingly, the columnar part 52 can be inserted into (engaged with) the groove 20. Further, the width of the groove 20 is made smaller than the diameter of the spherical part 51 of the stopper 50. Accordingly, the spherical part 51 is caught by the upper edge of the groove 20, so that the stopper 50 is supported by the upper edge of the groove 20. The width of the groove 20 is made larger as it extends forward.

The upper edge of the groove 20 is inclined along the upper surface 14a of the panel 14, or inclined downward in the forward direction from the recess 22. Accordingly, the upper edge of the groove 20 is ensured to be more inclined downward as it extends forward. The groove 20 has a lower edge which is inclined along the lower surface 14b of the panel 14. Accordingly, the level of the lower edge of the groove 20 is ensured to be higher as the lower edge extends forward. The lower edge of the groove 20 extends rearward (extends in a lateral direction from the front side to the rear side of the housing 12) so as to be longer than the upper edge of the groove 20.

As shown in FIGS. 1 and 6, the housing 12 is provided with a storage portion 25 for storing the electric cable 40. The storage portion 25 is located under the overhung portion 17 of the panel 14. The storage portion 25 is a rectangular parallelepiped space whose three sides are closed by the front plate 12a and the side plates 12b of the housing 12 leaving its front side being open. The top of the storage portion 25 is covered with the overhung portion 17 of the panel 14. The storage portion 25 has a length of about 0.7 m in the height direction, which is longer than half of each interval between the stoppers 50.

The charging apparatus 10 has a configuration as described above. When the charging apparatus 10 is not in the process of charging the storage battery of an electric car, the connector 70 and the electric cable 40 are stored as shown in FIG. 1. Specifically, the connector 70 is inserted into the opening 15a of the support member 15 and the stoppers 50 are sequentially hung on the respective hanging portions 18. Accordingly, the electric cable 40 is neatly folded zigzag and hung down beneath the overhang portion 17 so as to be stored in the storage portion 25. With the connector 70 and the electric cable 40 being stored as shown in FIG. 1, the length of the storage portion 25 in the height direction is larger than the length of the folds of the electric cable 40 hung down beneath the overhang portion 17. Accordingly, the lower end of each of the folds of the electric cable 40 is not in contact with the ground.

Figure 9:
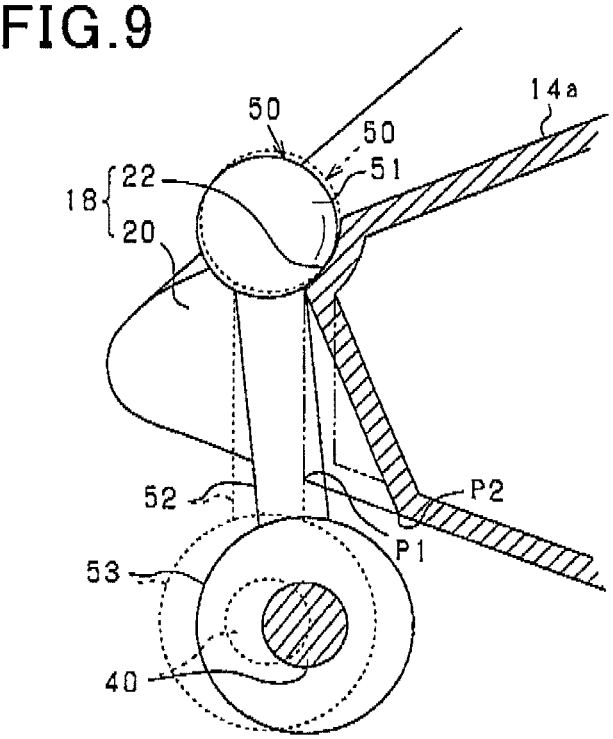
FIG. 9 is an enlarged cross-sectional view showing a state of engagement between the stopper and a hanging portion (holding member) of the body in FIG. 6.

FIG. 9 is an enlarged cross-sectional view showing a state where the hanging portion 18 is engaged with the stopper 50. As indicated by the dash-dot-dot line in FIG. 9, the lower edge of the groove 20 is not extended rearward (rightward in the figure) longer than the upper edge but only extended as long as the upper edge. In this case, when the electric cable 40 (annular part 53) is swung rearward, the columnar part 52 will hit against a front end (point P1 in FIG. 9) of the housing 12, which is located at a rear end of the lower edge of the groove 20. As a result, the spherical part 51 and the columnar part 52 are pivoted forward centering on the hit position (point P1) as a fulcrum. Thus, the columnar part 52 is likely to come off from the groove 20 despite the user's intention.

In this regard, as indicated by the solid line in FIG. 9, the lower edge of the groove 20 is extended rearward (rightward in the figure) longer than the upper edge. Therefore, when the electric cable 40 (annular part 53) is swung rearward, the columnar part 52 will hardly hit against a front end (point P2 in FIG. 9) of the housing 12, which is located at a rear end of the lower edge of the groove 20. Accordingly, the spherical part 51 and the columnar part 52 are hardly pivoted forward centering on the point P2 as a fulcrum. Thus, the columnar part 52 is suppressed from coming off from the groove 20 when the user intends to store the electric cable 40 in the storage portion 25.

Figure 10:
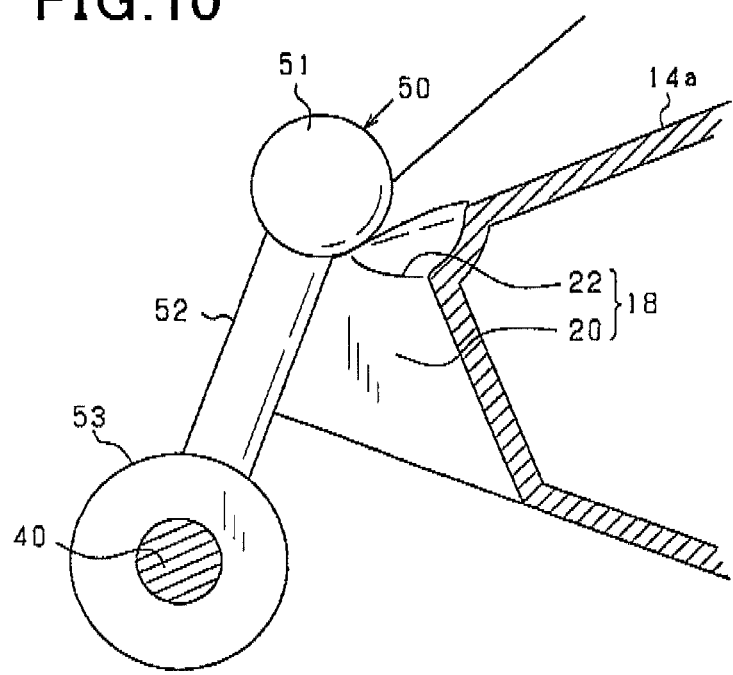
FIG. 10 is an enlarged cross-sectional view showing a state where the stopper is disengaged from the hanging portion in FIG. 9.

FIG. 10 is an enlarged cross-sectional view showing a state where the stopper 50 is disengaged from the hanging portion 18. When the storage battery of an electric car is charged, the connector 70 is pulled out of the opening 15a of the support member 15. When the connector 70 is brought near the electric car's connector to which the connector 70 is to be connected, the electric cable 40 connected to the connector 70 is pulled in the direction of the connector 70.

In this case, as shown in FIG. 10, the annular part 53 of the stopper 50 is pulled forward (leftward in the figure), so that the spherical part 51 is disengaged from the recess 22. The upper edge of the groove 20 is inclined along the upper surface 14a of the panel 14, i.e. inclined downward in the forward direction from the recess 22. Thus, the spherical part 51 disengaged from the recess 22 slides down forward along the inclination of the upper edge of the groove 20. Accordingly, if only the electric cable 40 is pulled forward (leftward in the figure) with a small force, the stoppers 50 are easily disengaged from the respective hanging portions 18. Further, since the stoppers 50 are sequentially disengaged, from the ones closer to the connector 70, from the hanging portions 18, the electric cable 40 can be extended in accordance with the distance between the charging apparatus 10 and the storage battery to be charged.

When the electric cable 40 is stored in the body 11 after completing charge of the storage battery, the connector 70 is firstly inserted into the opening 15a of the support member 15. Then, the stoppers 50 that have been disengaged from the hanging portions 18 are sequentially hung, from the ones closer to or farther from the connector 70, on the respective hanging portions 18. Since the diameter of each columnar part 52 is made smaller than that of the spherical part 51 and that of the annular part 53, the columnar part 52 will not be brought into contact with the ground and thus will not get dirty.

Accordingly, the user can hold each columnar part 52 and hang the stopper 50 on the corresponding hanging portion 18 hardly dirtying the user's hands. Further, since the width of the groove 20 of the hanging portion 18 is ensured to become larger as the groove 20 extends forward, each columnar part 52 can be easily inserted into the corresponding groove 20. When the stoppers 50 are hung on the respective hanging portions 18, the electric cable 40 is in a state of being hung down from the hanging portions 18. Thus, the electric cable 40 is neatly stored in the storage portion 25 being folded zigzag and hung with the folds being stretched by its weight.

The present exemplary embodiment described above has advantages as follows.

The electric cable 40 connecting between the body 11 and the connector 70 is provided with the stoppers 50 at predetermined positions in an intermediate portion of the electric cable 40. In the body 11, the hanging portions 18 are formed to detachably hold the respective stoppers 50. Thus, the configuration for storing the electric cable 40 can be simplified, while the electric cable 40 can be stored with a small amount of work by only hanging the stoppers 50 of the electric cable 40 on the respective hanging portions 18.

In the electric cable 40, the positions at which the electric cable 40 is held are always limited to the positions of the stoppers 50 and thus the electric cable 40 can be stored in a desired shape. Further, in the case where the electric cable 40 is wound about a wind-up member of the body 11, the electric cable 40 will be curled while being repeatedly wound about the wind-up member. However, in the charging apparatus of the present exemplary embodiment having the configuration as described above, the electric cable 40 will not be curled. Thus, the electric cable 40 can be easily extended when charging a storage battery.

Since the stoppers 50 are plurally provided at regular intervals in the electric cable 40, the electric cable 40 can be held at predetermined positions thereof every time it is stored. Further, the hanging portions 18 are juxtaposed in the body 11 so that they can be mated to the respective stoppers 50. Thus, the electric cable 40 held by the stoppers 50 is stored being folded zigzag with the folds being hung juxtaposed and stretched. As a result, the electric cable 40, even when it has a large length, can be efficiently stored in a desired shape.

In a state where the stoppers 50 are hung on the hanging portions 18, the stoppers 50 can be disengaged from the hanging portions 18 by pulling the electric cable 40 forward. Thus, if only the connector 70 is pulled toward the connector of the electric car when charging the storage battery, the electric cable 40 can be easily extended.

Since the diameter of the spherical part 51 of each stopper 50 is made larger than the width of the groove 20, the spherical part 51 can be supported by the upper edge of the groove 20. Thus, the stoppers 50 can be held by the respective hanging portions 18 with a simple configuration.

Each groove 20 is provided with the recess 20 to be engaged with the spherical part 51, the recess 20 including a rear end of the upper edge of the groove 20. Thus, the columnar part 52 will hardly come off from the groove 20 when the user intends to store the electric cable 40 in the storage portion 25. In addition, since the upper edge of the groove 20 is inclined downward in the forward direction from the recess 22, the spherical part 51 that has been disengaged from the recess 22 when the electric cable 40 is pulled forward, will easily slide down forward along the inclination of the upper edge. Thus, while the columnar part 52 is hardly permitted to come off from the groove 20 when the electric cable 40 is intended to be stored, the columnar part 52 can be easily disengaged from the groove 20 when a storage battery is charged.

The lower edge of the groove 20 is permitted to extend rearward longer than the upper edge of the groove 20. Thus, when the electric cable 40 is swung, the columnar part 52 is unlikely to hit against the front end of the housing 12, which is located at a rear end of the lower edge of the groove 20. Accordingly, the columnar part 52 will hardly come off from the groove 20 when the electric cable 40 is intended to be stored in the storage portion 25.

The panel 14 of the body 11 has the overhung portion 17 jutted out forward, with the hanging portions 18 being provided in the overhung portion 17. Thus, when the stoppers 50 are held by the respective hanging portions 18, the electric cable 40 is hung down beneath the overhung portion 17. Accordingly, in the charging apparatus 10 set up outside a residential house, the overhung portion 17 can mostly prevent rain drops from falling on the electric cable 40.

The housing 12 is provided with the storage portion 25 under the overhung portion 17 to store the electric cable 40 therein. Thus, at the same time with hanging down the electric cable 40 beneath the overhung portion 17, the electric cable 40 can be immediately stored in the storage portion 25.

The storage portion 25 is surrounded from three lateral directions facing the rear, left, and right sides of the housing 12, excluding one lateral direction facing the front side of the housing 12. Thus, the electric cable 40 stored in the storage portion 25 can be hardly seen from the surroundings.

The storage portion 25, which is provided under the overhung portion 17 having the hanging portions 18, has a length in the height direction which is made larger than a half of the interval between the stoppers 50. Thus, portions of the electric cable 40, each of which is held by the stoppers 50 at its ends, are hardly brought into contact with the ground. Accordingly, the electric cable 40 is stretched, or hardly loosened, and can be more neatly stored.

The exemplary embodiment described above may be implemented being modified as set forth below. In the modifications set forth below, the components identical with or similar to those in the first exemplary embodiment are given the same reference numerals for the sake of omitting unnecessary explanation.

Figure 11:
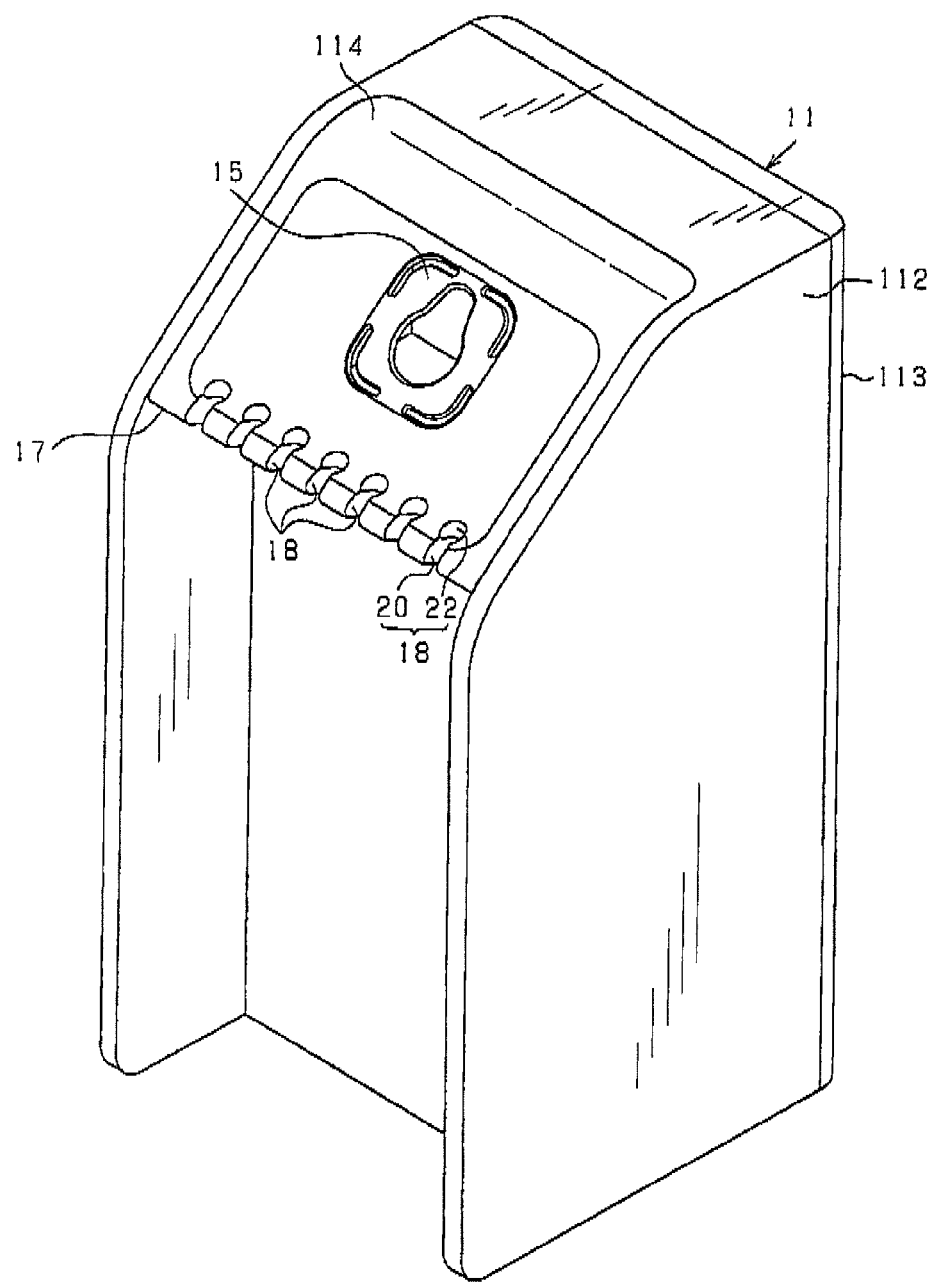
FIG. 11 is a perspective view showing a modification in which the number of hanging portions is changed, according to the first exemplary embodiment.
Figure 12:
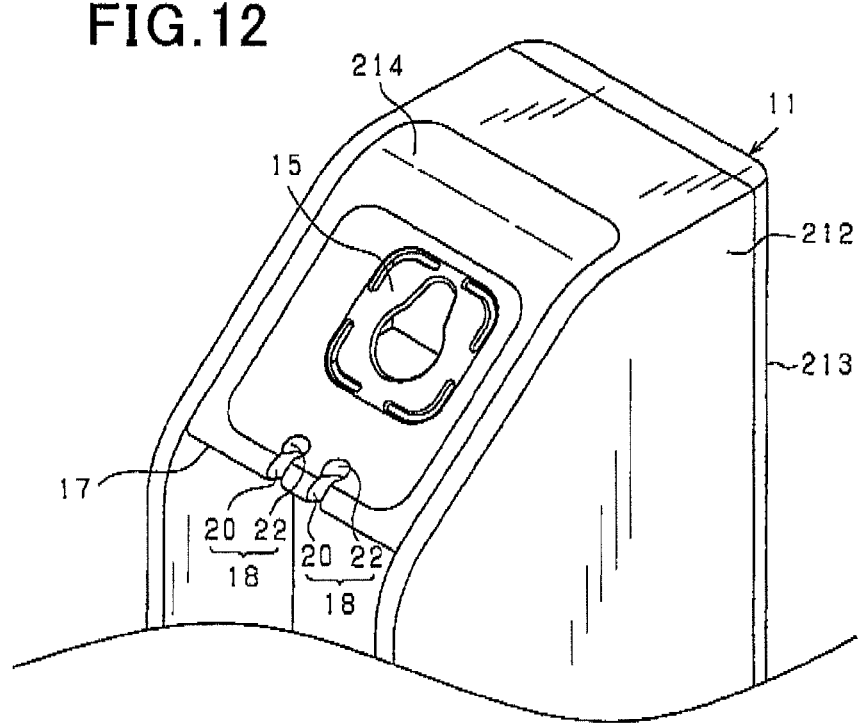
FIG. 12 is a partial perspective view showing another modification in which the number of hanging portions is changed, according to the first exemplary embodiment.

FIG. 11 shows a modification including a housing 112 in which the number of the hanging portions 18 is increased. FIG. 12 shows another modification including a housing 212 in which the number of the hanging portions 18 is decreased. As shown in FIGS. 11 and 12, the number of the hanging portions 18 may be changed according to the length of the electric cable 40. Specifically, the number of the hanging portions 18 may be increased as the electric cable 40 has a larger length and decreased as the electric cable 40 has a smaller length. When the number of the hanging portions 18 is increased, the housing 112 may have a larger width with the provision of a larger-width cover 113. When the number of the hanging portions 18 is decreased, the housing 212 may have a smaller width with the provision of a smaller-width cover 213. When the electric cable 40 has a much smaller length, the housing may include a panel in which a sole hanging portion 18 is formed.

Figure 13:
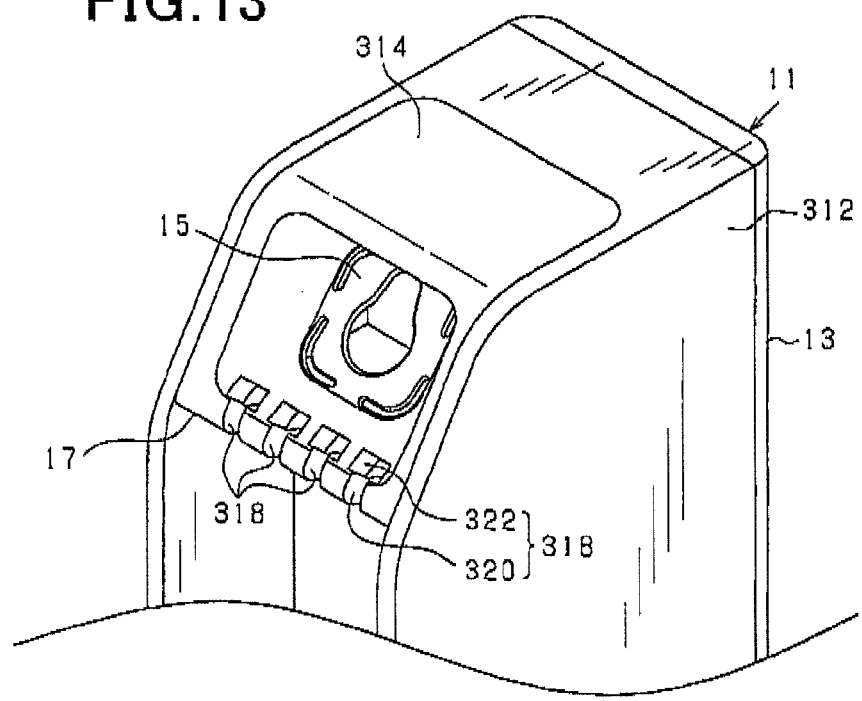
FIG. 13 is a partial perspective view showing a modification of a panel and the hanging portion, according to the first exemplary embodiment.

FIG. 13 shows a modification including a housing 312 which is provided with a modified panel 314 and modified hanging portions 318. As shown in FIG. 13, the front part of the panel 314 has a steeper angle of inclination than that of the front part of the panel 14 in the above exemplary embodiment, and thus the shape of the housing 312 is changed in conformity with the inclination. Further, the housing 312 may include hanging portions 318 each having a rectangular parallelepiped recess 322 and a groove 320. In this case as well, the stoppers 50 of the above exemplary embodiment can be hung on the respective hanging portions 318.

Figure 14:
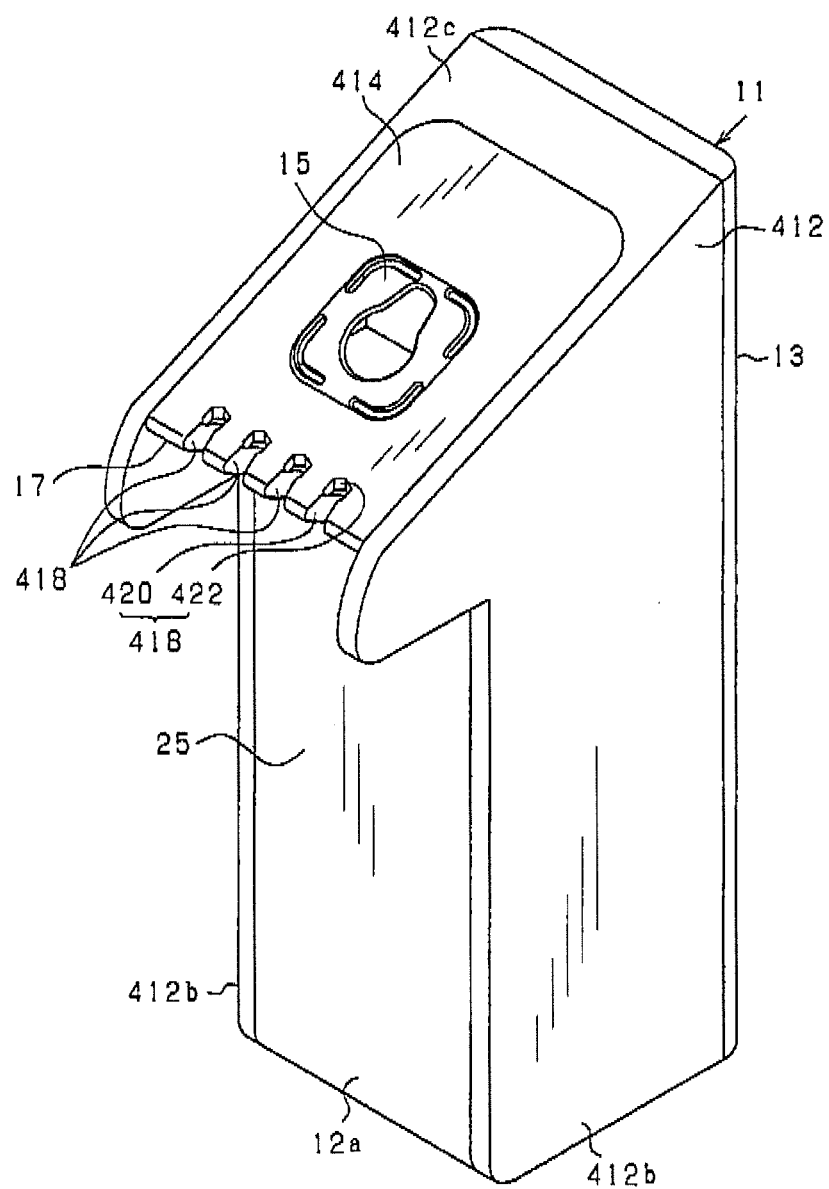
FIG. 14 is a perspective view showing a modification of a storage portion and the hanging portion, according to the first exemplary embodiment.

FIG. 14 shows a modification including a housing 412 which is provided with a modified storage portion 25 and a modified panel 414. As shown in FIG. 14, the storage portion 25 may include a rectangular parallelepiped space which is surrounded from one of four lateral directions. In this space, only rear side of the housing 412 is closed by only the front plate 12a of the housing 412. In other words, two side plates 412b of the housing 412 do not necessarily have to be extended forward to close the lateral sides of the storage portion 25. As shown in FIG. 14, the top of the storage portion 25 is covered with the overhung portion 17. Further, as also shown in FIG. 14, the panel 414 may have a flat upper surface. Further, the housing 412 may include hanging portions 413 each having a recess 422 which is formed into a hexagonal shape (polygonal shape).

Figure 15:
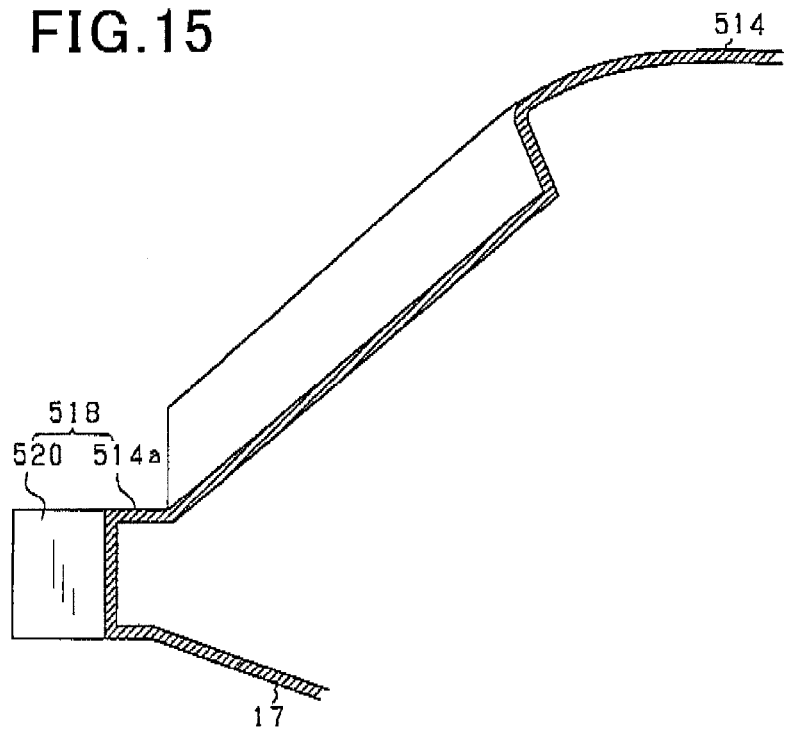
FIG. 15 is a cross-sectional view showing a modification of the hanging portion, according to the first exemplary embodiment.

FIG. 15 shows a modification including a panel 514 and modified hanging portions 518. As shown in FIG. 15, the hanging portions 518 may each have a groove 520 with its upper edge being horizontally formed. The hanging portions 518 are configured by the grooves 520 and an upper surface 514a of the panel 514 with no recesses 22 being provided in the respective grooves 520. In this case, there is no recess the spherical part 51 of each stopper 50 is fitted to but, instead, the upper surface 514a and the upper edge of the groove 520 can support the lower portion of the spherical part 51. Since the upper edge of each groove 520 is not inclined downward, the stopper 50 will hardly come off from the groove 520 when the electric cable 40 is intended to be stored. Therefore, if only the stoppers 50 of the electric cable 40 are hung on the hanging portions 518 of the body 11, the electric cable 40 can be stored with a small amount of work. Further, in a state where the stoppers 50 are held by the hanging portions 518, the electric cable 40 can be easily extended by only pulling the connector 70 toward the connector of an electric car when charging the storage battery. Each groove 520 may have the recess 22 that includes a rear end of the upper edge of the groove 520.

(Second Exemplary Embodiment)

Referring now to FIGS. 16 to 20, hereinafter is described a second exemplary embodiment. In the second exemplary embodiment, the components identical with or similar to those in the first exemplary embodiment are given the same reference numerals for the sake of omitting unnecessary explanation.

Figure 16:
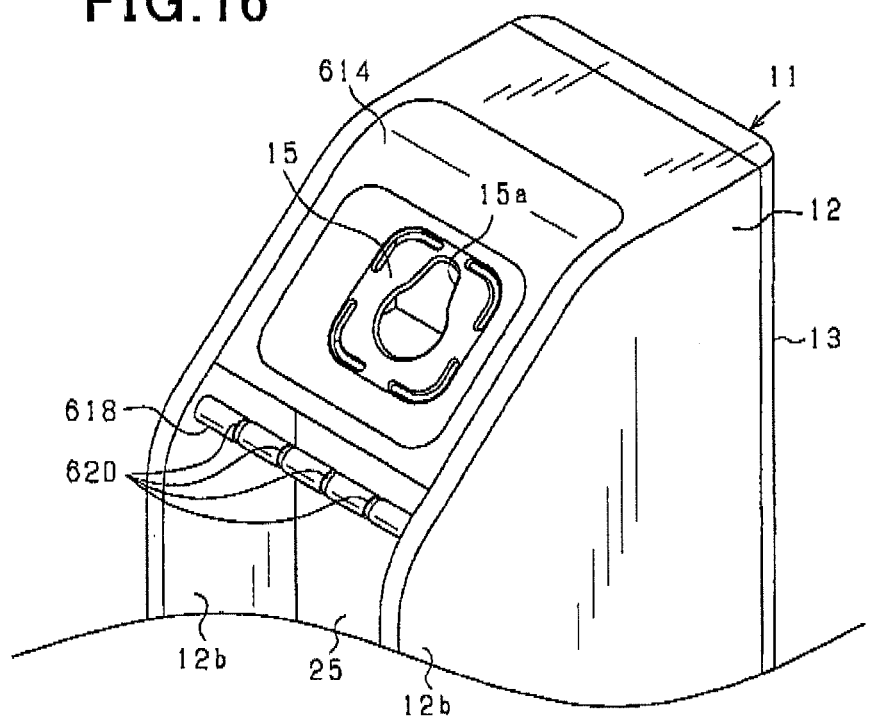
FIG. 16 is a partial perspective view showing a body of a charging apparatus according to a second exemplary embodiment.
Figure 17:
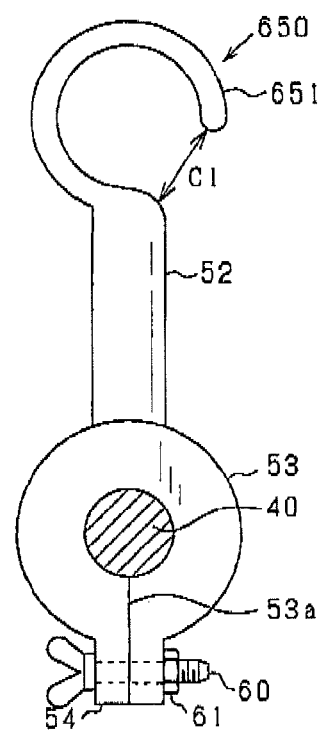
FIG. 17 is a front view showing a stopper (held portion), according to the second exemplary embodiment.

FIG. 16 shows the body 11 of the charging apparatus 10 according to the second exemplary embodiment. As shown in FIG. 16, the charging apparatus 10 includes a panel 614 and a hanging rod 618 (rod member) separately provided from the panel 614. FIG. 17 shows one of stoppers 650 (held member) according to the second exemplary embodiment. When the stoppers 650 attached to the electric cable 40 are hung on the hanging rod 618, the electric cable 40 is stored in the storage portion 25. The positions to which the stoppers 650 are attached in the electric cable 40 are the same as those in the first exemplary embodiment. Hereinafter, the second exemplary embodiment is described focusing on the differences from the first exemplary embodiment.

As shown in FIG. 16, the body 11 of the charging apparatus 10 is provided with the hanging rod 618 that extends in the lateral direction in a front part of the housing 12. The hanging rod 618 is provided between the pair of side plates 12b so as to cross over an upper part of the storage portion 25. The hanging rod 618 is made such as of stainless steel and formed into a columnar shape. In the hanging rod 618, grooves 620 are formed at regular intervals (predetermined intervals). Similar to the hanging portions 18 in the first exemplary embodiment, the number of the grooves 620 is determined according to the length of the electric cable 40. Each groove 620 (holding member) is formed throughout an outer periphery of the hanging rod 618 so as to have a predetermined width and a predetermined depth. The hanging rod 618 is not covered with anything over the top thereof.

As shown in FIG. 17, the stopper 650 (held member) includes a hooked part 651, the columnar part 52, the annular part 53 and the projected parts 54. Specifically, in the stopper 650, the spherical part 51 of the stopper 50 is replaced by the hooked part 651 but the other parts remain the same as those of the stopper 50. The hooked part 651 is formed into a C shape, with its inner diameter being made larger than the diameter of the hanging rod 618 inside the groove 620. The hooked part 651 has a gap C1 that has a width slightly larger than the diameter of the hanging rod 618 inside the groove 620. The hooked part 651 has a thickness which is slightly made smaller than the width of the groove 620 of the hanging rod 618.

When the electric cable 40 is stored in the body 11, the connector 70 is firstly inserted into the opening 15a of the support member 15. Then, the stoppers 650 that have been disengaged from the hanging rod 618 are sequentially hung, from the ones closer to or farther from the connector 70, on the respective grooves 620. In this sequential hanging, the gap C1 of the hooked part 651 in the stopper 650 is oriented rearward, so that the hooked part 651 is engaged with the corresponding groove 620 from obliquely above and from this side of the hanging rod 618. When the electric cable 40 is extended, each stopper 650 is lifted obliquely above to this side of the hanging rod 618 to disengage the hooked part 651 from the groove 620.

The second exemplary embodiment described above has the advantages as set forth below. The advantages set forth below are only those which are different from the advantages of the first exemplary embodiment.

The configuration for storing the electric cable 40 can be simplified, while the electric cable 40 can be stored with a small amount of work by only hanging the stoppers 650 of the electric cable 40 on the hanging rod 618 of the body 11.

When the electric cable 40 is swung, the stoppers 650 are unlikely to hit against the panel 614. Thus, the stoppers 650 will hardly be disengaged from the hanging rod 618 when the electric cable 40 is intended to be stored.

The charging apparatus 10 of the second exemplary embodiment is provided with the storage portion 25 under the hanging rod 618 to store the electric cable 40. Thus, at the same time with handing the electric cable 40 on the hanging rod 618, the electric cable 40 can be immediately stored in the storage portion 25.

The panel 614, being separately formed from the hanging rod 618, can have a simplified shape.

The second exemplary embodiment may be implemented being modified as follows. In the modifications set forth below, the components identical with or similar to those in the first and second exemplary embodiments are given the same reference numerals for the sake of omitting unnecessary explanation.

Figure 18:
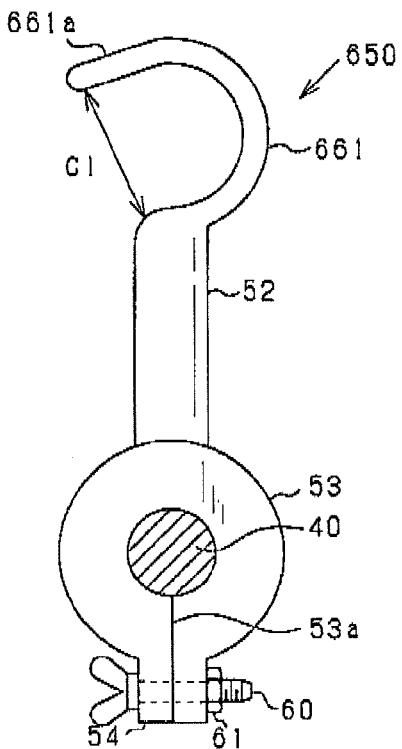
FIG. 18 is a front view showing a modification of the stopper, according to the second exemplary embodiment.

FIG. 18 shows a modification of the stopper 650. As shown in FIG. 18, the stopper 650 includes a hooked part 661 in which a straight portion 661a is formed. Specifically, the straight portion 661a is formed at an end of the hooked part 661. The straight portion 661a is started to be formed from a position, which is halfway around the hooked part 661 from its base end, and extends being bent radially inward with respect to the circumferential direction of the hooked part 661. In the hooked part 661, the gap C1 is formed that has a width slightly larger than the diameter of the hanging rod 618 inside the groove 620.

When the electric cable 40 is stored in the body 11, the connector 70 is firstly inserted into the opening 15a of the support member 15. Then, the stoppers 650 that have been disengaged from the hanging rod 618 are sequentially hung, from the ones closer to or farther from the connector 70, on the respective grooves 620. In this sequential hanging, each stopper 650 is passed rearward, or passed to the other side of the hanging rod 618, from under the hanging rod 618. Then, the gap C1 of the hooked part 661 in the stopper 650 is oriented forward, so that the hooked part 661 is engaged with the corresponding groove 620 from obliquely above and from the other side of (from behind) the hanging rod 618.

The electric cable 40, when it is extended, is pulled forward. Thus, the annular part 53 and the columnar part 52 are pivoted forward, centering on the hooked part 661 as a fulcrum. Since the straight portion 661a is formed in the hooked part 661, the hooked part 661 comes off from the groove 620 (hanging rod 618) when, in its pivotal movement, the end of the straight portion 661a is about to cross over the peak of the curve that is a part of the circumference of the hanging rod 618. Thus, the electric cable 40 can be easily extended if only the connector 70 is pulled toward the connector of an electric car when charging the storage battery.

Figure 19:
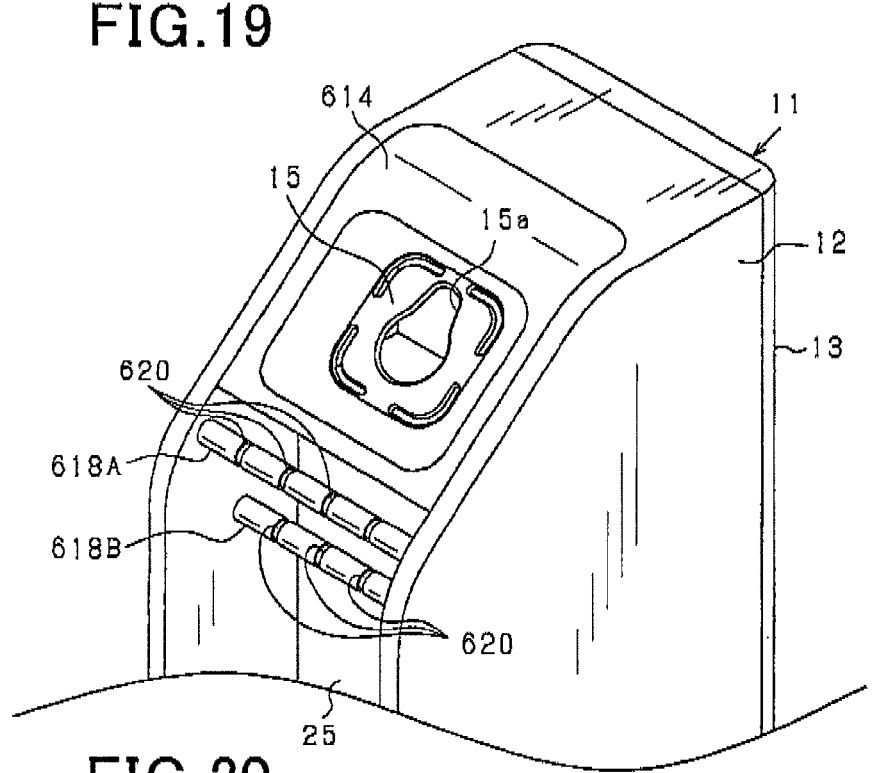
FIG. 19 is a partial perspective view showing a modification in arrangement of a hanging rod (holding member), according to the second exemplary embodiment.

FIG. 19 shows a modification of the hanging rod 618. As shown in FIG. 19, when the electric cable 40 is long, the body 11 may include a plurality of hanging rods 618 (618A and 618B). In this case, the hanging rods 618A and 618B may be arranged being offset in the front-rear direction of the housing 12.

Specifically, the hanging rod 618A may be arranged on a front side of the housing 12 with respect to the hanging rod 618B. At the same time, the hanging rod 618A may be arranged at a higher level than the hanging rod 618B. In conformity with the heights of the hanging rods 618A and 618B, the intervals between the stoppers 650 to be hung on the hanging rod 618B may be made smaller than the intervals between the stoppers 650 to be hung on the hanging rod 618A.

With this configuration, the electric cable 40 having a much larger length can be stored in the storage portion 25. At the same time, portions of the electric cable 40, each of which is held at its ends by the stoppers 650, are hardly brought into contact with the ground.

Figure 20:
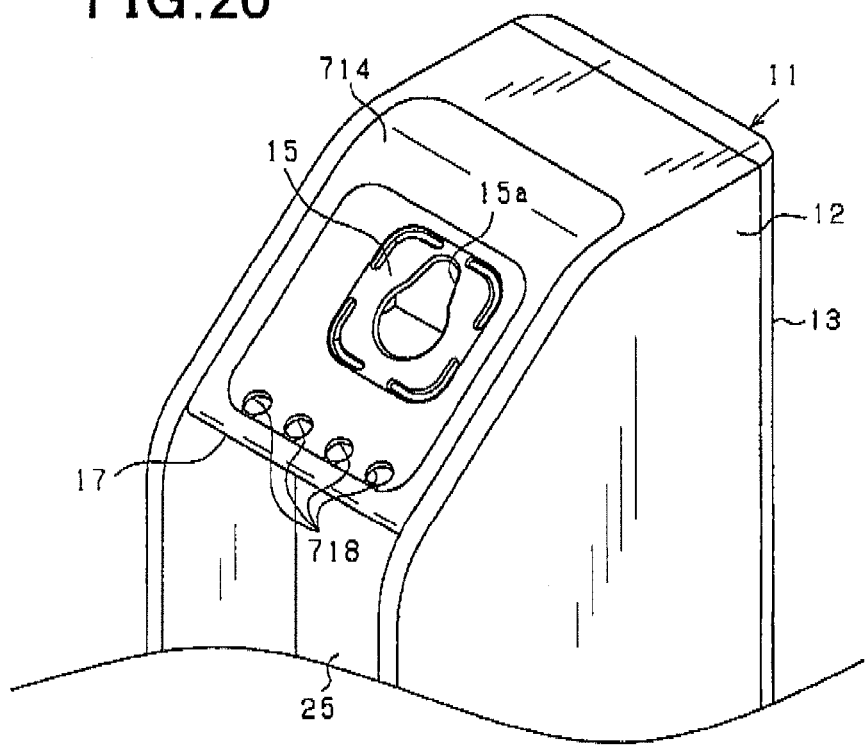
FIG. 20 is a partial perspective view showing a modification of the holding member, according to the second exemplary embodiment.

FIG. 20 shows a modification of a holding member. As shown in FIG. 20, the charging apparatus 10 may have a panel 714 in which through holes 718 are formed for the insertion of the hooked parts 651 (661) of the stoppers 650. With this configuration, the hooked parts 651 are inserted into the respective through holes 718, so that the stoppers 650 can be held by portions (holding member) of the panel 714, in which the through holes 718 are formed.

(Third Exemplary Embodiment)

Figure 21:
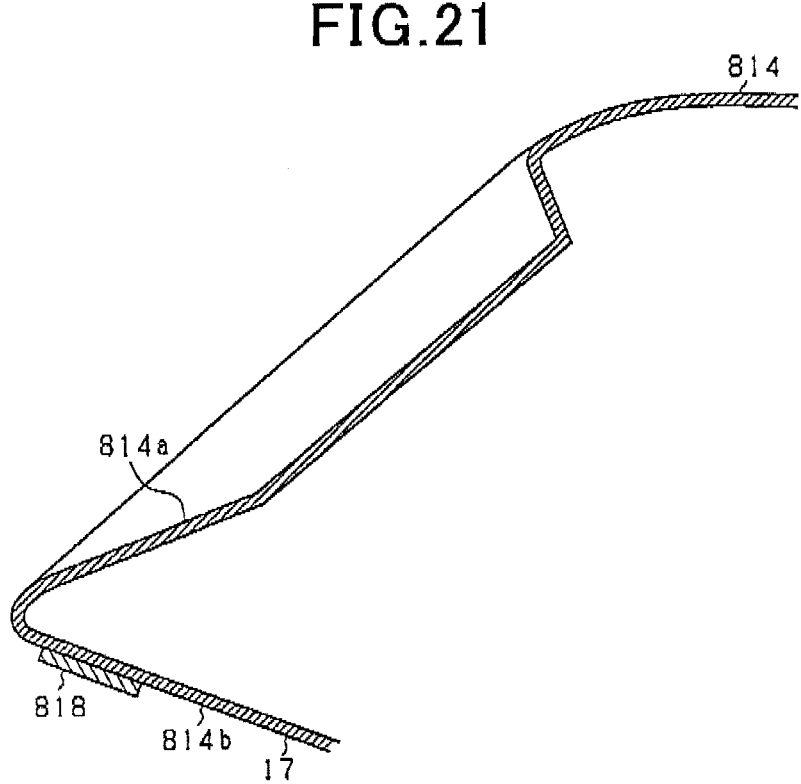
FIG. 21 is a cross-sectional view showing a holding member of a charging apparatus according to a third exemplary embodiment.
Figure 22:
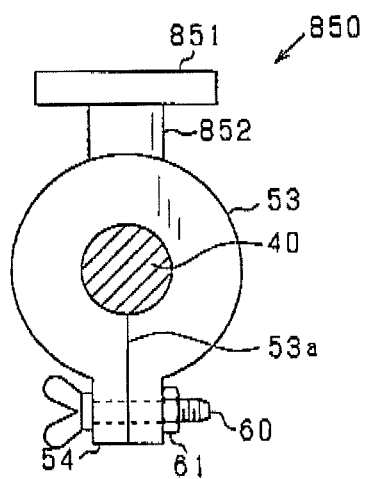
FIG. 22 is a front view showing a stopper of the charging apparatus according to the third exemplary embodiment.

Referring to FIGS. 21 and 22, hereinafter is described a third exemplary embodiment of the present invention. In the third exemplary embodiment, the components identical with or similar to those in the first and second exemplary embodiments are given the same reference numerals for the sake of omitting unnecessary explanation.

FIG. 21 shows a holding member of a charging apparatus according to the third exemplary embodiment. FIG. 22 shows one of stoppers 850 (held member) according to the third exemplary embodiment.

As shown in FIGS. 21 and 22, the charging apparatus of the third exemplary embodiment includes a panel 814. The panel 814 includes the overhung portion 17 which is provided with a plurality of magnets 818. The electric cable 40 is attached with the stoppers 850. In storing the electric cable 40 in the storage portion 25, the stoppers 850 are permitted to be attracted to the respective magnets 818. The positions to which the stoppers 850 are attached in the electric cable 40 are the same as those in the first exemplary embodiment. The third exemplary embodiment is described focusing on the differences from the first exemplary embodiment.

As shown in FIG. 21, the panel 814 has a lower surface 814b serving as the overhung portion 17, to which the plurality of magnets 818 (holding members) are attached. The magnets 818 are permanent magnets each having a disk-like shape. The plurality of magnets 818 are attached onto the lower surface 814b serving as the overhung portion 17 so as to be juxtaposed in a width direction of the panel 814 (direction perpendicular to the plane of the drawing paper) at regular intervals (predetermined intervals). The number of the magnets 818 is determined in a manner similar to the manner of determining the number of the hanging portions 18, i.e. determined according to the length of the electric cable 40.

As shown in FIG. 22, each stopper 850 (held member) includes a ferromagnetic part 851 (magnetic part), a columnar part 852, the annular part 53 and the projected parts 54. In other words, in the stopper 850, the spherical part 51 and the columnar part 52 of the stopper 50 are replaced by the ferromagnetic part 851 and the columnar part 852. Other parts of the stopper 850 remain the same as those of the stopper 50. The ferromagnetic part 851 is made of a ferromagnetic material, such as iron, and has a disk-like shape so as to match the shape of the magnet 818.

When the electric cable 40 is stored in the body 11, the connector 70 is firstly inserted into the opening 15a of the support member 15. Then, the ferromagnetic parts 851 of the stoppers 850 that have been detached from the magnets 818 are sequentially attached, from the ones closer to or farther from the connector 70, to the respective magnets 818 (sequentially held by the respective magnets 818). The electric cable 40, when it is extended, is pulled forward, so that the ferromagnetic parts 851 are detached from the magnets 818. Portions of the electric cable 40 fall down, in which the stoppers 850 are detached from the magnets 818. Thus, the electric cable 40 can be easily extended by only pulling the connector 70 toward the connector of an electric car when charging the storage battery.

(Other Modifications)

The exemplary embodiments described so far can also be implemented being modified as follows.

The connector 70 may have any shape and thus the support member 15 and the opening 15a may have a shape that matches the shape of the connector 70.

In the exemplary embodiments described above, the stoppers 50, 650 or 850 have been attached to the electric cable 40. Alternative to this, the stoppers may be formed integrally with an insulator of the electric cable 40.

The charging apparatus 10 may be set up inside a residential house. The configuration of the charging apparatus 10 is not limited to the one in which the connector 70 is connected to the connector of an electric car (vehicle). Instead, the connector 70 of the charging apparatus 10 may be connected to the connector which is connected to the storage battery of the car, without being intervened by the car. The charging apparatus 10 may be used for charging batteries other than those of vehicles.

Figure 23:
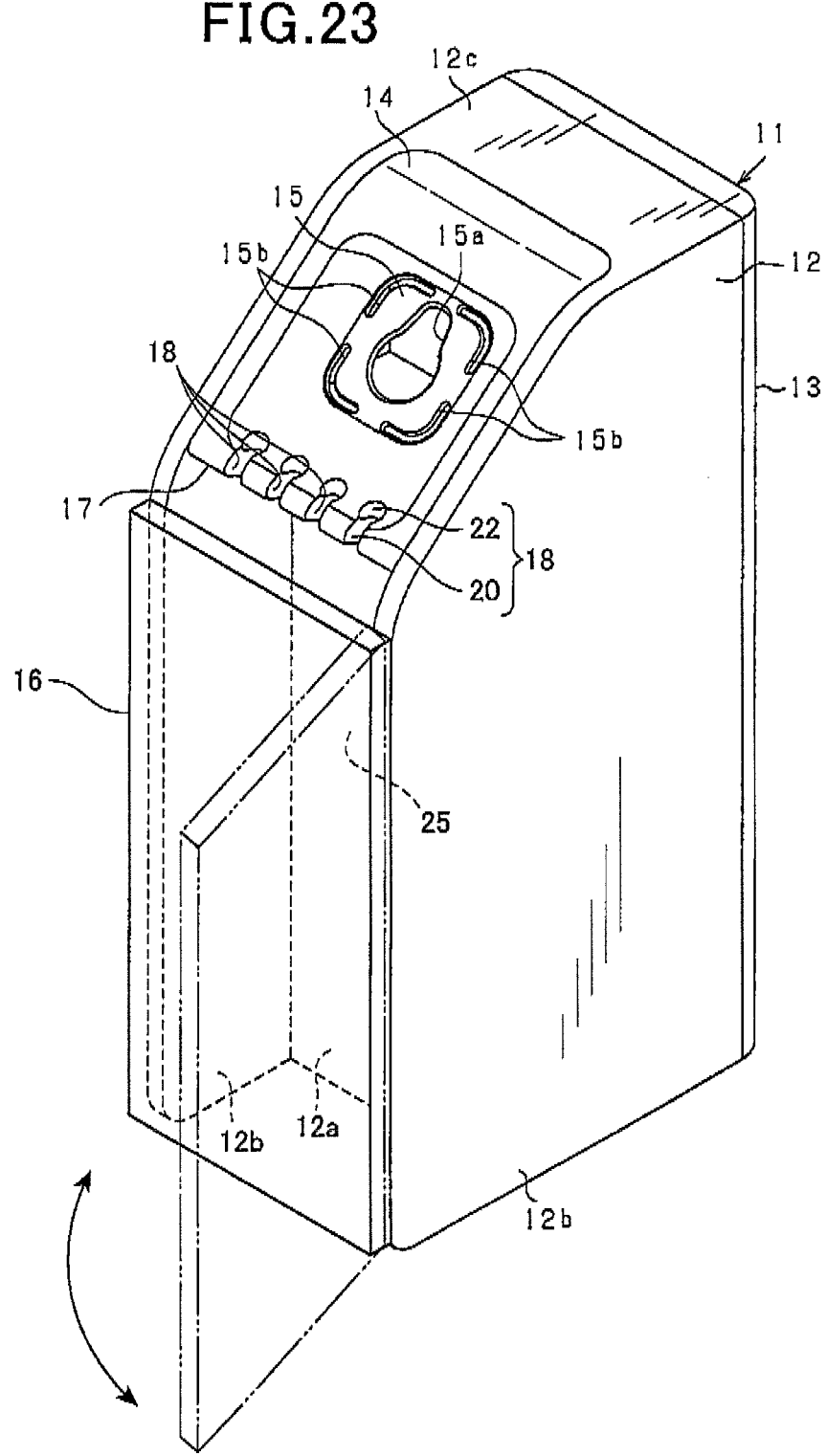
FIG. 23 is a perspective view showing a modification of the body, according to the first exemplary embodiment.

FIG. 23 shows a modification of the body 11 of the charging apparatus 10 according to the first exemplary embodiment. In this embodiment, the storage portion 25 is surrounded from three lateral directions facing the rear, left and right sides of the housing 12, excluding one lateral direction facing the front side of the housing 12.

In this modification as shown in FIG. 23, the body 11 is further provided with a door 16 that opens and closes an opening portion (front portion) of the storage portion 25 at the front side of the housing 12. In FIG. 23, the door 16 is configured by, for example, a hinged door which is jointed to the side plate 12b of the housing 12 by a hinge (not shown). The type of the door 16 is not limited to the hinged door. Another type may be applied to the door 16. The door 16 is operated to be open when the charging apparatus is used, and to be closed when it is not in use. Thus, when the charging apparatus is not in use, the storage portion 25 can be surrounded from four lateral directions facing the front, rear, left and right sides of the housing 12, thereby being able to further prevent the electric cable 40 stored in the storage portion 25 from being seen from the surroundings.

Figure 24:
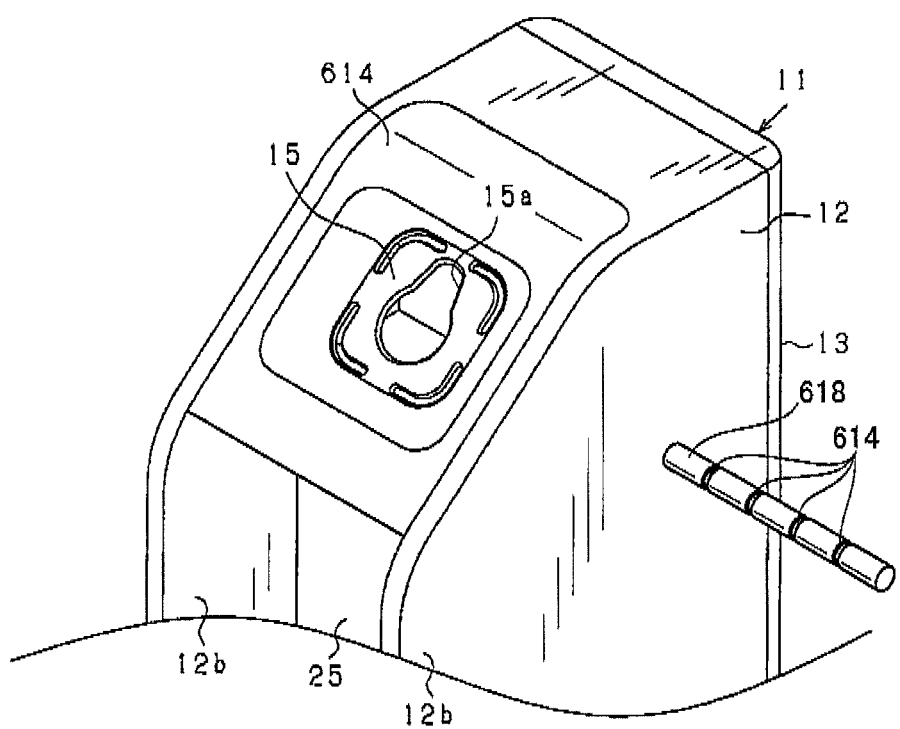
FIG. 24 is a partial perspective view showing a modification of the hanging portion, according to the second exemplary embodiment.

FIG. 24 shows a modification of the hanging rod 618, according to the second exemplary embodiment. In this embodiment, the hanging rod 618 (holding member) is positioned at the front side of the housing 12, but may be positioned at the left or right side of the housing 12. For example, in the modification as shown in FIG. 24, the hanging rod 618 is positioned at the right side of the housing 12, i.e., is provided in the housing 12 in such a manner of a cantilever stricture which one end of the hanging rod 618 is attached to the side plate 12b on the right side of the housing 12 and the other end laterally projects from it. Due to this, there is no need to place the hanging rod 618 or the hanging portion on the front side of the housing 12, which can increase a design freedom of the housing 12.

The above has described the present invention with reference to the exemplary embodiments and the modifications. However, the present invention is not limited to the above exemplary embodiments and the modifications. Various modifications apparent to those skilled in the art may be made on the configuration and details of the present invention within the scope of the present invention.

What is claimed is:

1. A charging apparatus for charging a storage battery, comprising:
   a body connected to a power source;
   a connector connected to the storage battery;
   an electric cable connecting between the body and the connector, the electric cable including at least one held member at a predetermined position in an intermediate portion of the electric cable;
   a support member provided in the body, the support member supporting the connector; and
   a holding member provided in the body, the holding member detachably holding the held member, wherein:
   the held member is a plurality of held members at predetermined intervals; and
   the holding member is a plurality of holding members each detachably holding each of the held members, the holding member being provided in the body so as to be juxtaposed with each other.

2. The charging apparatus according to claim 1, wherein:
   the held member is configured to be disengaged from the holding member by pulling the electric cable in a predetermined direction in a state where the held member is held by the holding member.

3. The charging apparatus according to claim 2, wherein:
   in the holding member, a groove is formed so as to vertically communicate with outside and to laterally extend; and
   the held member includes: an engaging part engaged with the groove; and a head part being larger than the width of the groove.

4. The charging apparatus according to claim 3, wherein:
   the groove includes an upper edge in which a recess engaged with the head part is formed, the upper edge being inclined downward from the recess.

5. The charging apparatus according to claim 4, wherein:
   the groove includes a lower edge which laterally extends longer than the upper edge.

6. The charging apparatus according to claim 5, wherein:
   the body includes:
   an overhung portion laterally projected from the body, the holding member being formed in the overhung portion; and
   a storage portion storing the electric cable, the storage portion being provided below the overhung portion.

7. The charging apparatus according to claim 6, wherein:
   the storage portion is surrounded from three of four lateral directions facing four lateral sides which are front, rear, left and right sides of the body.

8. The charging apparatus according to claim 7, wherein:
   the held member is a plurality of held members which are provided in the electric cable at predetermined intervals; and
   the storage portion has a vertical length in a height direction perpendicular to the lateral direction, the vertical length being larger than half of each of the predetermined interval.

9. The charging apparatus according to claim 6, wherein:
   the storage portion is surrounded from four lateral directions facing four lateral sides which are front, rear, left and right sides of the body.

10. The charging apparatus according to claim 1, wherein:
    in the holding member, a groove is formed so as to vertically communicate with outside and to laterally extend; and
    the held member includes: an engaging part engaged with the groove; and a head part being larger than the width of the groove.

11. The charging apparatus according to claim 1, wherein:
    the holding member is positioned at a front side of the body.

12. The charging apparatus according to claim 1, wherein:
    the holding member is positioned at a left or right side of the body.

13. A charging apparatus for charging a storage battery, comprising:
    a body connected to a power source;
    a connector connected to the storage battery;

an electric cable connecting between the body and the connector, the electric cable including at least one held member at a predetermined position in an intermediate portion of the electric cable;

a support member provided in the body, the support member supporting the connector; and a holding member provided in the body, the holding member detachably holding the held member, wherein the body includes:

an overhung portion laterally projected from the body, the holding member being formed in the overhung portion; and a storage portion storing the electric cable, the storage portion being provided below the overhung portion.

14. The charging apparatus according to claim 13, wherein:

the held member is a plurality of held members which are provided in the electric cable at predetermined intervals; and the storage portion has a vertical length in a height direction perpendicular to the lateral direction, the vertical length being larger than half of each of the predetermined intervals.

15. A charging apparatus for charging a storage battery, comprising:

a body connected to a power source;

a connector connected to the storage battery;

an electric cable connecting between the body and the connector, the electric cable including at least one held member at a predetermined position in an intermediate portion of the electric cable;

a support member provided in the body, the support member supporting the connector; and a holding member provided in the body, the holding member detachably holding the held member, wherein:

the holding member includes a rod member in which a groove is formed at predetermined intervals; and the held member includes a hooked part engaged with the groove of the rod member.

16. A charging apparatus for charging a storage battery, comprising:

a body connected to a power source;

a connector connected to the storage battery;

an electric cable connecting between the body and the connector, the electric cable including at least one held member at a predetermined position in an intermediate portion of the electric cable;

a support member provided in the body, the support member supporting the connector; and a holding member provided in the body, the holding member detachably holding the held member, wherein;

the holding member includes a magnet; and the held member includes a magnetic part which allows the held member to be held by the holding member by means of attraction between the magnetic part and the magnet.

* * * * *